(12) United States Patent
Powers et al.

(10) Patent No.: US 9,756,495 B1
(45) Date of Patent: Sep. 5, 2017

(54) REDUCING FRAUDULENT ACTIVITY ASSOCIATED WITH MOBILE NETWORKS

(71) Applicant: Global Business Software Development Technologies, Inc., Lubbock, TX (US)

(72) Inventors: Michael W. Powers, Lubbock, TX (US); Stephen P. Frisbie, Lubbock, TX (US); Ch'ng Kean Kok, Kuala Lumpur (MY); Nemencio Paggao, Singapore (SG)

(73) Assignee: Global Business Software Development Technologies, Inc., Lubbock, TX (US)

( * ) Notice: Subject to any disclaimer, the term of this patent is extended or adjusted under 35 U.S.C. 154(b) by 0 days.

(21) Appl. No.: 15/251,558

(22) Filed: Aug. 30, 2016

(51) Int. Cl.
| | |
|---|---|
| *H04M 11/04* | (2006.01) |
| *H04W 4/22* | (2009.01) |
| *H04W 4/02* | (2009.01) |
| *H04W 12/12* | (2009.01) |
| *H04W 12/06* | (2009.01) |
| *H04W 84/04* | (2009.01) |

(52) U.S. Cl.
CPC .............. *H04W 4/22* (2013.01); *H04W 4/02* (2013.01); *H04W 12/06* (2013.01); *H04W 12/12* (2013.01); *H04W 84/042* (2013.01)

(58) Field of Classification Search
CPC ..... H04W 4/22; H04W 76/007; H04W 64/00; H04W 76/02; H04W 84/04; H04W 36/14; H04W 4/028; H04W 4/025; H04W 64/003; H04M 2242/04; H04M 11/04; H04M 2242/30; H04M 3/436; H04M 3/5116; H04M 1/2535
USPC ............ 455/404.2, 404.1, 456.1, 414.1, 415, 455/422.1, 445, 456.3, 457; 379/45, 37, 379/221.01
See application file for complete search history.

(56) References Cited

U.S. PATENT DOCUMENTS

2008/0293409 A1    11/2008    Gillot et al.

OTHER PUBLICATIONS

U.S. Appl. No. 15/216,475, filed Jul. 21, 2016, Powers et al.
U.S. Appl. No. 15/216,452, filed Jul. 21, 2016, Powers et al.

*Primary Examiner* — Fred Casca
(74) *Attorney, Agent, or Firm* — Baker Botts L.L.P.

(57) ABSTRACT

In one embodiment, a network interface receives a communication associated with a networked device over a communication link of a radio access network. A processor determines whether the communication is an emergency communication, and a memory stores location information of the networked device associated with the emergency communication. The network interface then receives, from a requesting user, a location request, wherein the location request identifies a requested networked device. The processor determines whether the identification of the requested networked device matches an identification of the networked device. When the identification of the requested networked device matches the identification of the networked device, the network interface further operable to communicate the location information of the networked device to the requesting user.

14 Claims, 3 Drawing Sheets

| Call Origination Date and Time | Subscriber's IMEI | Cell ID | Communication Type |
|---|---|---|---|
| 12/1/16 13:45 | 123456789012345 | 65535 | Emergency |
| 12/1/16 13:46 | 123456789012345 | 73456 | Non-Emergency |
| 12/1/16 13:57 | 234567890123456 | 15268 | Non-Emergency |
| 12/1/16 14:12 | 345678901234567 | 86532 | Emergency |
| 12/1/16 14:15 | 456789012345678 | 48568 | Non-Emergency |
| 12/1/16 14:16 | 456789012345678 | 76353 | Non-Emergency |
| 12/1/16 14:45 | 567890123456789 | 89653 | Non-Emergency |

| Call Origination Date and Time | Subscriber's IMEI | Cell ID | Communication Type |
|---|---|---|---|
| 12/1/16 13:45 | 123456789012345 | 65535 | Emergency |
| 12/1/16 13:46 | 123456789012345 | 73456 | Non-Emergency |
| 12/1/16 13:57 | 234567890123456 | 15268 | Non-Emergency |
| 12/1/16 14:12 | 345678901234567 | 86532 | Emergency |
| 12/1/16 14:15 | 456789012345678 | 48568 | Non-Emergency |
| 12/1/16 14:16 | 456789012345678 | 76353 | Non-Emergency |
| 12/1/16 14:45 | 567890123456789 | 89653 | Non-Emergency |

REDUCING FRAUDULENT ACTIVITY ASSOCIATED WITH MOBILE NETWORKS

TECHNICAL FIELD

This invention relates in general to mobile networks, and more particularly to reducing fraudulent activity associated with mobile networks.

BACKGROUND

Mobile communication devices have become ubiquitous in modern day society. Countless individuals communicate with one another using mobile communication devices over a wireless network. Moreover, individuals may communicate domestically or internationally, or may even communicate over their networked devices when travelling abroad. The increased complexity and availability of the mobile communication network has led to an increased susceptibility of fraudulent activity. Fraudulent activity is an enormous threat to the telecommunication industry, especially because network operators across the world tend to earn a significant portion of revenue from roaming subscribers.

Fraudsters, for example, may attempt to impermissibly access the location of a subscriber. As location tracking by service providers is becoming increasingly widespread, service providers are tracking the location of its subscribers for both emergency and non-emergency communications. In particular, government and/or internal regulations may prohibit a third-party from accessing a location of a subscriber for non-emergency communication by the subscriber. However, a fraudster may still impermissibly request the location of a subscriber, particularly for non-emergency communications.

SUMMARY OF PARTICULAR EMBODIMENTS

According to embodiments of the present disclosure, disadvantages and problems associated with fraudulent activity related to mobile networks may be reduced or eliminated.

In accordance with a particular embodiment of the present disclosure, a network interface receives a communication associated with a networked device over a communication link of a radio access network. A processor determines whether the communication is an emergency communication, and a memory stores location information of the networked device associated with the emergency communication. The network interface then receives, from a requesting user, a location request, wherein the location request identifies a requested networked device. The processor determines whether the identification of the requested networked device matches an identification of the networked device. When the identification of the requested networked device matches the identification of the networked device, the network interface further operable to communicate the location information of the networked device to the requesting user.

Certain embodiments of the present disclosure may provide one or more technical advantages. A technical advantage of one embodiment includes decreasing network congestion and enabling higher throughput from networked devices by alleviating fraudulent communications or requests and decreasing the processing demand on elements of a cellular network. As another example, a technical advantage of one embodiment includes improving the communication quality of networked devices in a servicing area, improving the security of cellular networks and signaling protocols, and improving the processing power of a cellular network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DESCRIPTION OF EXAMPLE EMBODIMENTS

Embodiments of the present invention and its advantages are best understood by referring to FIGS. 1-4, like numerals being used for like and corresponding parts of the various drawings.

Networked devices have become ubiquitous in modern day society. Countless individuals communicate with one another using networked devices over a wireless network. Moreover, individuals may communicate domestically or internationally, or may even communicate over their networked devices when travelling abroad. The increased complexity and availability of the mobile communication network has led to an increased susceptibility of fraudulent activity. Fraudulent activity is an enormous threat to the telecommunication industry, especially because network operators across the world tend to earn a significant portion of revenue from roaming subscribers.

The teachings of this disclosure recognize that it would be desirable to provide a system that stores location information of a networked device associated with an emergency communication, and communicate the location information of the networked device associated with the emergency communication when a requesting user submits a location request of the networked device. This system would reduce or eliminate technical problems associated with fraudsters impermissibly accessing the location of networked devices for non-emergency communications.

Figure 1:
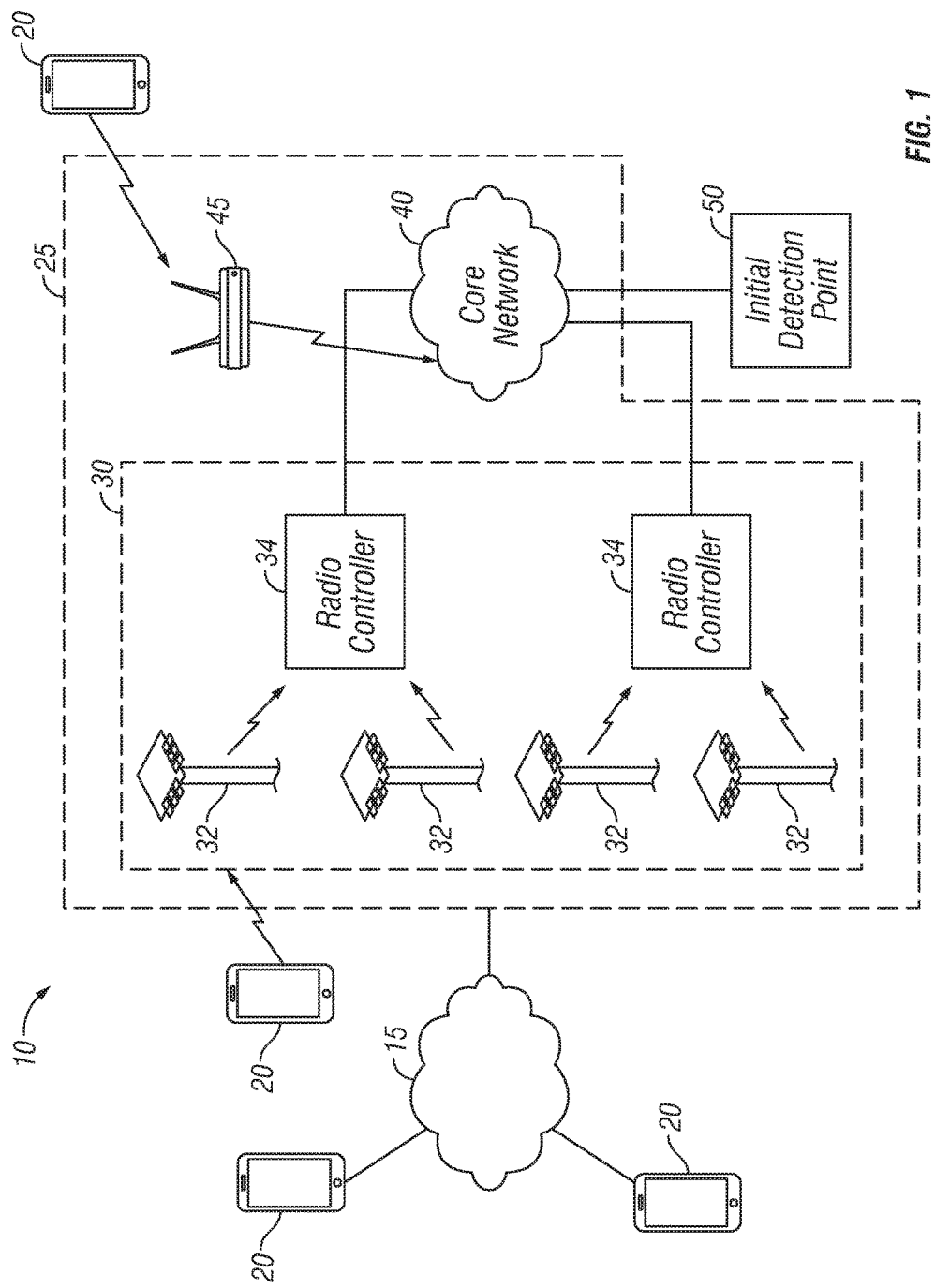
FIG. 1 illustrates a mobile communication system in which an initial detection point has been installed.

FIG. 1 illustrates mobile communication system 10 in which initial detection point 50 has been installed. Mobile communication system 10 provides mobile communication service to networked devices 20 operating within a geographic area associated with mobile communication system 10. Mobile communication system 10 includes networked device 20; networked device 20 may include an access network 30, and core network 40. Mobile communication system 10 may support communication of any suitable type and/or in accordance with any appropriate communication standards including, but not limited to, any second generation ("2G"), third generation ("3G"), or fourth generation ("4G") standards, fifth generation ("5G") standards, or any suitable transitional generation standards (e.g., 2.5G, 2.75G, 3.5G, and 3.9G). Particular embodiments of mobile communication system 10 may support communications in accordance with, for example, Global System for Mobile Communications (GSM), CDMAOne, General Packet Radio Service (GPRS), Enhanced Data rates for GSM Evolution (EDGE), CDMA2000, Integrated Digital Enhanced Network (iDen), Universal Mobile Telecommunications System (UMTS), Wideband Code Division Multiple Access (WCDMA), Long Term Evolution (LTE), Long Term Evolution Advanced (LTE-Advanced), and/or Worldwide Interoperability for Microwave Access (WiMAX) communication standards.

Network 15 facilitates communications between components in mobile communication system 10, such as networked devices 20 and mobile network 25. This disclosure contemplates any suitable network 15 operable to facilitate communication between the components of system 10. Network 15 may include any interconnecting system capable of transmitting audio, video, signals, data, messages, or any combination of the preceding. Network 15 may include all or a portion of a public switched telephone network ("PSTN"), a public or private data network, a local area network ("LAN"), a metropolitan area network ("MAN"), a wide area network ("WAN"), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 15.

Networked device 20 is a mobile communication device being used by a caller through mobile communication system 10. Networked device 20 is any type of networked device, including but not limited to networked device 20, mobile network 25, access network 30 (including base stations 32 and radio controllers 34), or core network 40. A networked device may be implemented using any suitable type of processing system and may include any suitable combination of hardware, firmware, and software. In certain embodiments, networked device 20 may comprise a mobile device, access network 30 (including base stations 32 and radio controllers 34), and/or core network 40. In certain embodiments, networked device 20 may be networked device 20. Networked device 20 may include one or more networked devices at one or more locations. Each networked device 20 may include any appropriate number of input devices, output devices, mass storage media, processors, memory, or other suitable components for receiving, processing, storing, and communicating data. For example, each networked device 20 may include a personal computer, workstation, network computer, kiosk, wireless data port, personal digital assistants ("PDAs"), one or more Internet Protocol (IP) telephones, smart phones, table computers, one or more servers, a server pool, one or more processors within these or other devices, or any other suitable processing device capable of receiving, processing, storing, and/or communicating information with other components of mobile communication system 10. Networked device 20 may be a stand-alone computer or may be a part of a larger network of computers associated with an entity. Networked device 20 may also be a SIM box, an analog telephone adaptor ("ATA"), or a Private Branch eXchange ("PBX"). Moreover, multiple networked devices 20 may exist in a SIM box.

Networked device 20 may communicate in mobile communication system 10 over a communication link on the radio access network. In certain embodiments, networked device 20 communicates to mobile network 25 via network 15. Networked device 20 may communicate directly to core network 40, through access point 45, and, in particular embodiments, networked device 20 may comprise mobile network 25.

Networked device 20 may be associated with a subscriber identifier and a hardware identifier. The subscriber identifier identifies the user and/or SIM of networked device 20. For example, a subscriber identifier may comprise a mobile identifier number ("MIN"), mobile subscriber identification number ("MSIN"), integrated circuit card ID ("ICC-ED"), international mobile subscriber identifier ("IMSI"), or mobile subscriber international ISDN number ("MSISDN"). Similarly, a hardware identifier identifies the hardware of networked device 20. For example, a hardware identifier may comprise an International Mobile Station Equipment Identity ("IMEI"), electronic serial number ("ESN"), or a mobile equipment identifier ("MEID").

Mobile network 25 is any type of network or networked device that is able to communicate with networked device 20, access network 30 (including base stations 32 and radio controllers 34), or core network 40. Mobile network 25 may be implemented using any suitable type of processing system and may include any suitable combination of hardware, firmware, and software. In certain embodiments, mobile network 25 may comprise networked device 20, access network 30 (including base stations 32 and radio controllers 34), and/or core network 40. In certain embodiments, mobile network 25 may be networked device 20. In the illustrated embodiment, mobile network 25 includes access network 30, core network 40, and access point 45. Mobile network 25 may include one or more mobile networks at one or more locations. Mobile network 25 may represent or include a radio access network and/or any elements responsible for providing a radio or air interface to networked device 20 and/or other elements of mobile communication system 10.

Access network 30 communicates wirelessly with networked devices 20 and serves as an interface between networked devices 20 and core network 40. Access network 30 may represent or include a radio access network and/or any elements responsible for providing a radio or air interface for core network 40. For example, in the illustrated embodiment, access network 30 includes base stations 32 and radio controllers 34. Access network 30 may also comprise mobility services edge ("MSE") routers. Networked device 20 may communicate to access network 30 over a communication link on the radio access network. In certain embodiments, access network 30 may support Integrated Services Digital Network ("ISDN") access signaling.

Base stations 32 communicate wirelessly with networked devices 20 to facilitate mobile communication for networked devices 20. Base stations 32 may include any appropriate elements to communicate with networked devices 20 and to interface networked devices 20 with core network 40. For example, depending on the communications standards supported by access network 30 and core network 40, each base station 32 may represent or include a conventional base station, a Node B, an evolved Node B (eNode B), a radio base station (RBS), or any other suitable element capable of communicating with networked devices 20 wirelessly.

Radio controllers 34 control the operation of base stations 32 and interact with appropriate elements of core network 40. Radio controllers may include any appropriate elements to manage the operation of base stations 32. In particular embodiments, radio controllers 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio controllers 34 may each represent or include a base station controller (BSC), a radio network controller (RNC), or any other suitable collection of hardware and/or software appropriate for controlling base stations 32.

Core network 40 routes voice and/or data communicated by networked devices 20 from access network 30 to other networked devices 20 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in embodiments of mobile communication system 10 that support GSM or UMTS, core network 40 may represent a Mobile Application Part (MAP) core network, while in embodiments of mobile communication system 10 that support CDMA2000, core network 40 may represent an IS-41 core network. Additionally, core network 40 may also be responsible for aggregating communication for longhaul transmission, authenticating users, managing user mobility, providing call control, billing, or other functionality associated with providing communication services to networked devices 20. In particular embodiments, core network 40 may include separate subnetworks for circuit-switched and packet-switched communication. For example, in embodiments that support GSM communication, core network 40 may include a network switching subsystem and any mobile switching centers (MSCs) for providing circuit-switched services, as well as a GPRS core network and any Gateway GPRS Support Nodes (GGSNs) and Serving GPRS Support Nodes (SGSNs) for providing packet-switched services. In general, core network 40 may include any components suitable for routing and supporting voice and/or data communications for networked devices 20.

Access point 45 is a component that facilitates communications between networked device 20 and core network 40. While illustrated as facilitating communication between networked device 20 and core network 40, access point 45 may facilitate communication between network 15, networked devices 20, networked device 20, access network 30, core network 40, and/or any other component of mobile communication system 10. Access point 45 is any type of networking device that allows one networked device to communicate with another networked device. Mobile communication system 10 may comprise one or more access points 45. Access point 45 may include any interconnecting system capable of transmitting audio, video, signals, data, messages, or any combination of the preceding. Access point 45 may include all or a portion of a PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of access point 45.

In certain embodiments, core network 40 may support Customized Applications for Mobile Networks Enhanced Logic ("CAMEL") protocol. The CAMEL protocol is a set of standards designed to work on either a GSM or UMTS network. When a CAMEL-enabled subscriber registers with core network 40, core network 40 transfers CAMEL subscription information ("CSI") to networked devices that need the information to provide CAMEL service to the subscriber. Network traffic through the CAMEL protocol may be referred to as on-network traffic.

Moreover, core network 40 may also support the ISDN User Part ("ISUP") protocol. The ISUP protocol defines a set of procedures and messages. The ISUP protocol may provide core network signaling and may be compatible with both ISDN and non-ISDN traffic. Network traffic through the ISUP protocol may be referred to as off-network traffic.

Initial detection point 50 represents any suitable component that facilitates storing location information of a networked device associated with an emergency communication, and communicating the location information of the networked device associated with the emergency communication when a requesting user requests a location request of the networked device. Initial detection point 50 may be connected to core network 40. Initial detection point 50 may include a network server, any suitable remote server, a mainframe, a host computer, a workstation, a web server, a personal computer, a file server, or any other suitable device operable to communicate with computers 24. In some embodiments, initial detection point 50 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of initial detection point 50 may be performed by any suitable combination of one or more servers or other components at one or more locations. In the embodiment where the components are servers, the servers may be public or private servers, and each server may be a virtual or physical server. The server may include one or more servers at the same or at remote locations. Also, initial detection point 50 may include any suitable component that functions as a server.

In an exemplary embodiment of operation, access network 30 receives a communication from networked device 20. In an embodiment, access network 30 receives and communicates the communication to core network 40, and core network 40 communicates the communication associated with networked device 20 to initial detection point 50. In certain embodiments, the emergency communication associated with networked device 20 may comprise the real-time communication communicated from networked device 20, a copy of the communication from networked device 20, or information associated with the communication from networked device 20. In certain embodiments, initial detection point 50 may assess the communication from networked device 20 to identify and store pertinent information from the communication. Example information associated with the emergency communication from networked device 20 may comprise date and time, duration, a subscriber identifier, a hardware identifier, location information, and any other trackable information associated with the emergency communication. In certain embodiments, networked device 20 may communicate and initial detection point 50 may receive multiple emergency communications.

Initial detection point 50 may receive all communications between networked device 20 and access network 30 in certain embodiments. In this embodiment, initial detection point 50 may be able to determine whether the communication is an emergency communication or non-emergency communication. An emergency communication may pertain to a communication to emergency personnel. Initial detection point 50 may analyze the information associated with networked device 20 and/or recipient to determine if the information associated with networked device 20 and/or recipient comprises information associated with an emergency. For example, initial detection point 50 may analyze the outgoing dialed number to determine if networked device 20 placed a communication to an emergency number (e.g., 911 in America). Initial detection point 50 may also analyze the Emergency Alert System, wireless emergency alerts, 911 call processor and delivery, Public Safety Answer Points, call dispatches, enhanced 911 information, networked device's location, or any other information for initial detection point to determine if a communication is an emergency communication. In certain embodiments, initial detection point 50 may track the location information at the origination of the emergency call, during the duration of the emergency call, and/or at the termination of the emergency call.

The initial detection point 50 may determine location information of networked device 20 associated with the emergency communication. For example, initial detection point 50 may extract information from appropriate communication links within mobile communication system 10 and, based on the extracted information, determine location information for particular networked device 20. The location for a particular networked device 20 may be determined by the location of the servicing base station 32, cell tower triangulation, advanced forward link trilateration, radio measurements, wi-fi data, information communicated from networked device 20 (e.g., Global Positioning System ("GPS") software, client software, signal strengths of home and neighboring cell stations), or any other method to determine an approximate or specific location of networked device 20. In particular embodiments, initial detection point 50 may be capable of collecting information from multiple base stations 32 and/or radio controllers 24 and aggregating the collected information, thereby permitting initial detection point 50 to determine and store locations for several different networked devices 20 located throughout the geographic area served by mobile communication system 10. In alternate embodiments, initial detection point 50 receives the location information from another element in mobile communication system 10. Initial detection point 50 may then store the location information of networked device 20 associated with the emergency communication in a database. Location information may be any type of information that provides a location regarding networked device 20. This includes, but is not limited to, an identification of a base station (e.g., cell identifiers ("Cell ID")), GPS coordinates of networked device 20, a physical location address, point-of-interests near networked device 20, and area name. If multiple emergency communications are made by networked device 20, initial detection point 50 may store each location associated with each emergency communication in the database.

To ascertain the location of networked device 20, a requesting user may communicate one or more location requests to initial detection point 50. The requesting user may communicate the location request directly to initial detection point 50 or may communicate the request to access network 30 or core network 40. The location request is a communication indicating a request to identify a location for one or more requested networked devices 20. The location request may identify requested networked device 20 by using the phone number associated with networked device 20, IMSI associated with requested networked device 20, IMEI associated with requested networked device 20, MEID associated with requested networked device 20, a user name associated with the user of requested networked device 20, or any form of identification that allows initial detection point 50 to determine requested networked device 20.

Once a location request is received, initial detection point 50 determines whether the identification of the requested networked device 20 matches an identification of networked device 20 that placed an emergency communication. The identification of networked device 20 may comprise the phone number associated with networked device 20, IMSI associated with requested networked device 20, IMEI associated with requested networked device 20, MEID associated with requested networked device 20, a user name associated with the user of requested networked device 20, or any form of identification for networked device 20. In certain embodiments, initial detection point 50 determines whether the requested networked device 20 exists in the database storing all emergency communications in the system. In alternate embodiments, initial detection point 50 determines whether the requested networked device 20 originated an emergency communication. If initial detection point 50 determines that the requested networked device 20 did not originate an emergency communication, initial detection point 50 may block the location request. Initial detection point 50 may block the location request by not responding to the location request, responding to the location request and indicating that the request is not valid or authorized, or any other form of blocking that does not provide the location information of the requested device to the requesting user. On the other hand, if networked device 20 matches a requested networked device, initial detection point 50 may communicate location information to the requesting user. Initial detection point 50 may communicate the location of base station 32 that received the emergency communication, coordinates of networked device 20 when the emergency communication was made, or any other type of information that indicates the location of networked device 20 during the initiation, duration, and/or termination of the emergency communication. In certain embodiments, initial detection point 50 may only communicate the location information for an emergency communication that occurred within a predetermined time period of receiving the location request. For example, initial detection point 50 may only communicate the location information for an emergency communication that occurred within the past seven days of receiving the location request.

In particular embodiments, the location request from the requesting user comprises a time criteria. The time criteria indicates a requested period of time to locate the emergency communication. The time criteria may indicate that the emergency communication occurred before, during, or after a specific time or time period. The initial detection point 50 may determine if the requested networked device 20 originated any emergency communications during the time criteria. If initial detection point determines that an emergency communication by the requested networked device 20 took place during the time criteria, initial detection point 50 may communicate the location information for the emergency communication to the requesting user. Moreover, if multiple emergency communications by networked device 20 were made, initial detection point 50 may communicate only the location information associated with requested networked device 20 within the time criteria. In certain embodiments, initial detection point 50 may communicate multiple location information if the requested networked device 20 placed multiple emergency communication calls within the time criteria.

Moreover, when initial detection point 50 receives a second communication associated with networked device 20, initial detection point 50 may determine whether the second communication is a second emergency communication. If the second communication is a second emergency communication, initial detection point 50 may determine and store the second location information of networked device 20 associated with the second emergency communication. Initial detection point 50 may also be able to determine whether a second time associated with the second emergency communication is within the time criteria. If the identification of the requested device matches the identification of networked device 20 and the second time associated with the second emergency communication is within the time criteria, initial detection point 50 may communication the second location information of networked device 20 to the requesting user.

In certain embodiments, initial detection point 50 determines if an identifier of the requesting user matches an identifier in an authorized requester list. The authorized requester list identifies authorized requesting users that are allowed to obtain location information from initial detection point 50. In certain embodiments, initial detection point 50 may block a location request unless initial detection point 50 first determines that the requesting user identifier matches an identifier in the authorized requester list.

Initial detection point 50 may communicate the location information to the requesting user. The location information may include one or more types of location-based data. For example, the location-based data may comprise the location of base station 32 that received the emergency communication, coordinates of requested networked device 20 when originating or terminating the emergency communication, or any other type of information that indicates the location of networked device 20 during the initiation, duration, and/or termination of the emergency communication.

Modifications, additions, or omissions may be made to mobile communication system 10 without departing from the scope of the invention. For example, mobile communication system 10 may include any number of networked devices 20, access networks 30 (including base stations 32 and radio controllers 34), core network 40, and initial detection points 50. Furthermore, the components of mobile communication system 10 may be integrated or separated. For example, access network 30, core network 40, and initial detection point 50 may be incorporated into a single component.

Figures 2, 3:
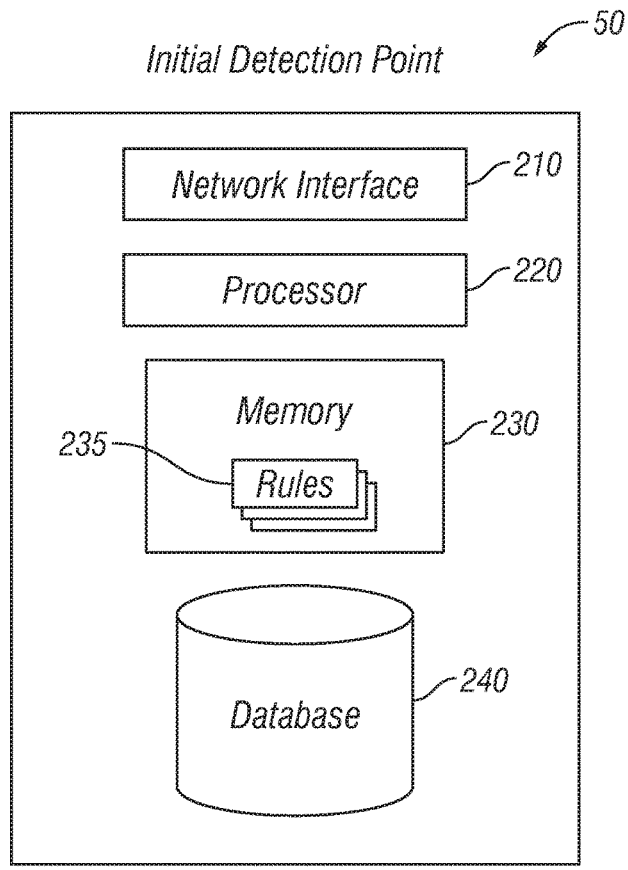
FIG. 2 is a block diagram showing in greater detail the contents of the initial detection point according to particular embodiments.
FIG. 3 illustrates an exemplary communication logging table that logs communication originations with the associated networked device identifier, location information, and communication type.

FIG. 2 is a block diagram showing in greater detail the contents of initial detection point 50 according to particular embodiments. As shown, initial detection point 50 includes network interface 210, processor 220, memory 230, and database 240.

Network interface 210 facilitates communication between processor 220, core network 40, or other components of initial detection point 50 or mobile communication system 10 over a data network. Network interface 210 may facilitate communication over portions of core network 40 or over a separate data network. In particular embodiments, network interface 210 includes or represents one or more network interface cards (NICs).

Processor 220 may represent or include any form of processing components, including dedicated microprocessors, general-purpose computers, or other devices capable of processing electronic information. Examples of processor 220 include field-programmable gate arrays (FPGAs), programmable microprocessors, digital signal processors (DSPs), application-specific integrated circuits (ASICs), and any other suitable specific- or general-purpose processors. Although FIG. 2 illustrates, for the sake of simplicity, an embodiment of initial detection point 50 that includes a single processor 220, initial detection point 50 may include any number of processors 220 configured to interoperate in any appropriate manner. For example, in particular embodiments, initial detection point 50 may include three field programmable gate arrays configured to store location information of a networked device associated with an emergency communication, and communicate the location information of the networked device associated with the emergency communication when a requesting user requests a location request of the networked device.

Memory 230 stores processor instructions, filter parameters, routing information, and/or any other data utilized by initial detection point 50 during operation. Memory 230 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 2, memory 230 may include one or more physical components local to or remote from initial detection point 50. Memory 230 may include rules 235.

Rules 235 may include logic, rules, algorithms, code, tables, and/or other suitable instructions embodied in a computer-readable storage medium. Rules 235 may comprise a set of policy rules. Processor 220 may access rules 235 in applying rules to determine the action to apply to a location request as described with respect to FIG. 1. Rules 235 may apply across some, all, or none of the initial detection point 50.

Database 240 represents a database that stores, either permanently or temporarily, location information of networked device 20 during an emergency communication. Database 240 includes any one or a combination of volatile or non-volatile local or remote devices suitable for storing information. For example, database 240 may include random access memory (RAM), read only memory (ROM), magnetic storage devices, optical storage devices, or any other suitable information storage device or a combination of these devices. Database 240 may include any suitable information for use in the operation of initial detection point 50. Additionally, database 240 may be included within initial detection point 50, rather than being a component external to initial detection point 50. Database 240 may be located in initial detection point 50, core network 40, access network 30, mobile communication system 10, or any other location suitable for database 240 to communicate with initial detection point 50. In certain embodiments, database 240 can be located in memory 230.

In particular embodiments, the structural components of initial detection point 50 may be attached to one or more chassis for mounting in a standard nineteen-inch ("19") or twenty-three-inch ("23") electronic rack. As a result, initial detection point 50 may represent a rack-mountable component that may be inserted into standard equipment racks commonly used to house telecommunications equipment in modern mobile communication systems, such as racks complying with EIA-310-D and/or EN 300 119. Thus, particular embodiments of initial detection point 50 may be easily integrated with existing equipment in many types of mobile communication systems. Furthermore, in particular embodiments, the components used to provide the functionality described for initial detection point 50 may be fit on a single chassis or a collection of chasses.

A component of initial detection point 50 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to initial detection point 50 without departing from the scope of the invention. For example, initial detection point 50 may include any number of network interfaces 210, processors 220, memory 230, or databases 240. Furthermore, the components of initial detection point 50 may be integrated or separated. For example, network interface 210, processor 220, memory 230, and database 240 may be incorporated into a single component.

FIG. 3 illustrates an exemplary communication logging table 300 that logs communication originations with the associated date and time, networked device identifier, location information, and communication type. Although illustrated as a table, communication logging table 300 may be presented in a text file, a data structure, or any other means such that the information may be communicated across mobile communications network 10. In the illustrated table, communication logging table 300 includes date and time field 310, networked device identifier field 320, location information field 330, and communication type field 340.

Date and time field 310 indicates a date and time that the communication originated. In certain embodiments, date and time field 310 may indicate the origination of the call, duration of the call, and/or the termination of the call. Although date and time field 310 is depicted in a specific format, date and time field 310 may be in a variety of formats and fields.

Networked device identifier field 320 includes information identifying networked device 20 that originated the call. In this example, networked device 20's IMEI is used as networked device identifier in networked device identifier field 320. As an additional example, networked device 20 may be identified by its MIN, MSIN, ICC-ED, IMSI, MSISDN, ESN, MEID, or any other type of identifier that identifies networked device 20 as originating the call.

Location information field 330 includes location-based data. For example, location information may comprise the location of base station 32 that received the emergency communication, the GPS coordinates of requested networked device 20 when originating or terminating the emergency communication, or any other type of information that indicates the location of networked device 20 during the initiation, duration, and/or termination of the emergency communication. In the illustrated communication logging table 300, the cell ID (i.e., the identifier of base station 32) is logged in location information field 330. A requesting user may use the cell ID to determine a location of networked device 20 during the emergency communication.

Communication type field 340 includes information identifying whether networked device 20 communicated an emergency communication or non-emergency communication. In certain embodiments, initial detection point 50 determines whether a communication is an emergency or non-emergency by identifying the number of the outgoing communication as an emergency number. In particular embodiments, an emergency communication is a communication to an emergency service.

Modifications, additions, or omissions may be made to communication logging table 300 without departing from the scope of the disclosure. For example, communication logging table 300 may include any other suitable fields that provide information about a communication. Additionally, the fields in communication logging table 300 may be organized and/or arranged in any suitable manner.

Figure 4:
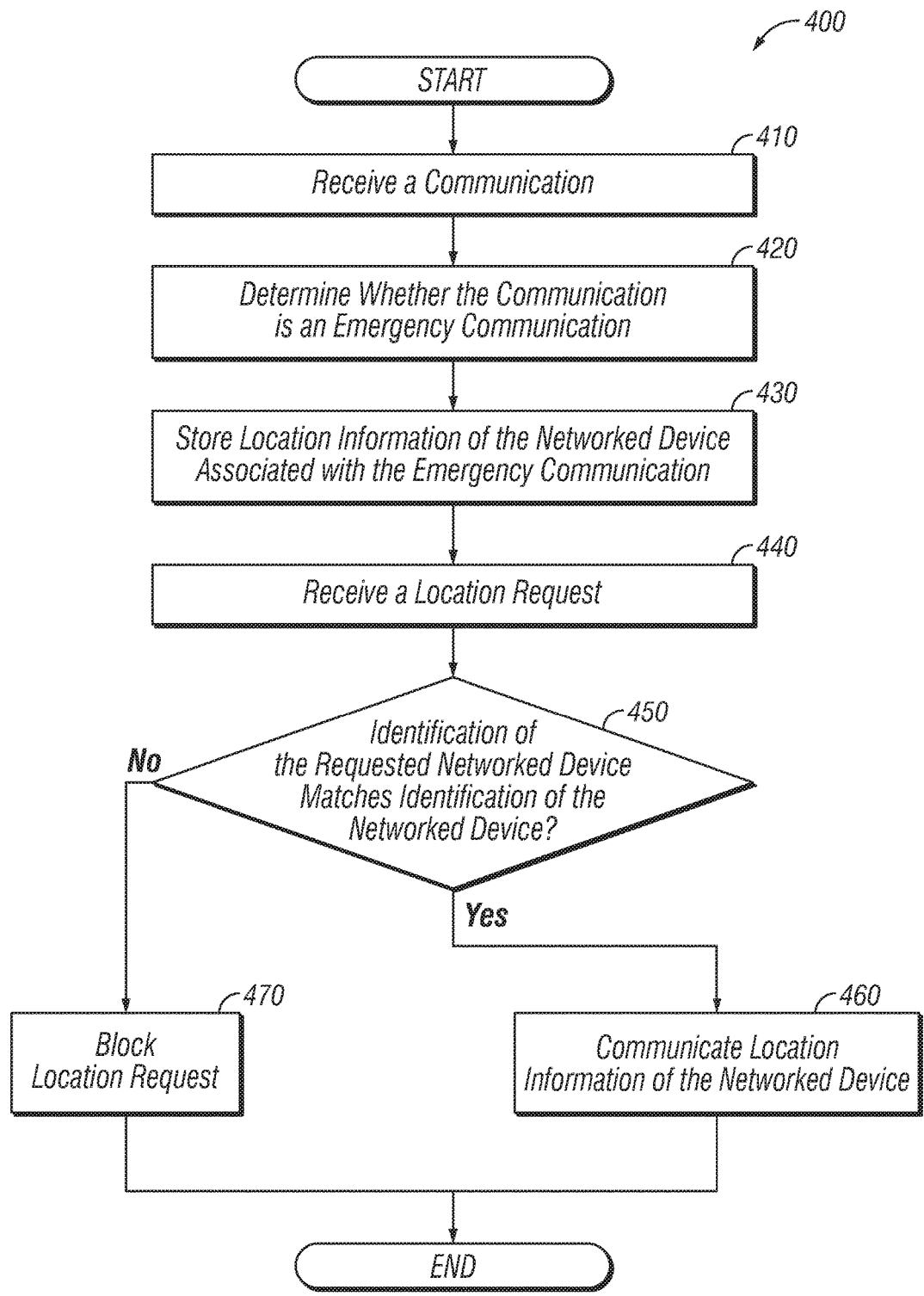
FIG. 4 illustrates an example method for storing location information of a networked device associated with an emergency communication, and communicating the location information of the networked device associated with the emergency communication when a requesting user requests a location request of the networked device.

FIG. 4 illustrates example method 400 for storing location information of a networked device associated with an emergency communication, and communicating the location information of networked device 20 associated with the emergency communication when a requesting user requests a location request for networked device 2.

At step 410, initial detection point 50 receives a communication from networked device 20. In certain embodiments, access network 30 receives a communication from networked device 20, and communicates the connection associated with networked device 20 to initial detection point 50. In other embodiments, access network 30 receives a communication from networked device 20, and provides that communication to core network 40. Core network 40 may then relay the communication to initial detection point 50.

Initial detection point 50 determines at step 420 whether the communication is an emergency communication. Initial detection point 50 may analyze the information associated with networked device 20 and/or recipient of the communication to determine if the information associated with networked device 20 and/or recipient comprises information associated with an emergency. For example, initial detection point 50 may analyze the outgoing dialed number to determine if networked device 20 placed a communication to an emergency number (e.g., 911 in the United States of America). Initial detection point 50 may also analyze the Emergency Alert System, wireless emergency alerts, 911 call processor and delivery, Public Safety Answer Points, call dispatches, enhanced 911 information, networked device's location, or any other information for initial detection point to determine if a communication is an emergency communication.

At step 430, initial detection point 50 stores location information of the emergency communication in database 240. Initial detection point 50 may determine location information of networked device 20 associated with the emergency communication. For example, initial detection point 50 may extract information from appropriate communication links within mobile communication system 10 and, based on extracted information, determine locations for particular networked device 20 service by mobile communication system 10. The location for a particular networked device 20 may be determined by any method providing an approximate or specific location of networked device 20. If multiple emergency communications are made by networked device 20, initial detection point 50 may store each location associated with each emergency communication in database 240.

At step 440, a requesting user may communicate one or more location requests to initial detection point 50. The requesting user may communicate the location request directly to initial detection point 50 or may communicate the request to access network 30 or core network 40. The location request may identify requested networked device 20 by using the phone number associated with networked device 20, IMEI associated with requested networked device 20, MEID associated with requested networked device 20, a user name associated with the user of requested networked device 20, or any form of identification that allows initial detection point 50 to determine requested networked device 20.

At step 450, initial detection point 50 determines whether the identification of the requested networked device matches an identification of networked device 20 that placed an emergency communication. In certain embodiments, initial detection point 50 determines whether the requested networked device 20 originated an emergency communication. Initial detection point 50 may also store a time associated with the emergency communication in the database. In particular embodiments, the location request from the requesting user comprises a time criteria. The time criteria may indicate that the emergency communication occurred before, during, or after a specific time or time period. Initial detection point 50 may determine if the requested networked device 20 originated any emergency communications during the time criteria.

If the identifier of the requested networked device matches an identification of networked device 20 that placed an emergency communication, the method proceeds to step 460 where initial detection point 50 communicates location information of networked device 20 to the requesting user. Initial detection point 50 may communicate the location of base station 32 that received the emergency communication, GPS coordinates of networked device 20 when the emergency communication was made, or any other type of information that indicates the location of networked device 20 during the initiation, duration, and/or termination of the emergency communication. In certain embodiments, initial detection point 50 may only communicate the location information for an emergency communication that occurred within a predetermined time period of receiving the location request.

On the other hand, if initial detection point 50 determines that the requested networked device 20 did not originate an emergency communication, initial detection point 50 may block the location request at step 470. Initial detection point 50 may block the location request by not responding to the location request, responding to the location request and indicating that the request is not valid or authorized, or any other form of blocking that does not provide the location information of the requested device to the requesting user.

Modifications, additions, or omissions may be made to the method depicted in FIG. 4. The method may include more, fewer, or other steps. While discussed as initial detection point 50 performing the steps, any suitable component of mobile communication system 10 may perform one or more steps of the method. Additionally, steps may be performed in parallel or in any suitable order.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
a network interface operable to receive a communication associated with a networked device over a communication link of a radio access network;
a processor communicatively coupled to the network interface and operable to determine whether the communication is an emergency communication;
a memory communicatively coupled to the network interface and the processor and operable to store location information of the networked device associated with the emergency communication;
the network interface further operable to receive, from a requesting user, a location request, wherein the location request identifies a requested networked device;
the processor further operable to determine whether the identification of the requested networked device matches an identification of the networked device; and
the network interface further operable to communicate the location information of the networked device to the requesting user when the identification of the requested networked device matches the identification of the networked device;
wherein the processor is further operable to block the location request when the identification of the requested networked device does not match the identification of the networked device; and wherein:
the memory is further operable to store a time associated with the emergency communication; the location request further comprises a time criteria; the processor is further operable to determine whether the time associated with the emergency communication is within the time criteria; and the network interface is further operable to communicate location information of the networked device when the identifier of the requested networked device matches the identifier of the networked device and the time associated with the emergency communication is within the time criteria.

2. The apparatus of claim 1, wherein the processor is further operable to determine whether the emergency communication occurred within a predetermined time period of receiving the location request.

3. The apparatus of claim 1, wherein:
the network interface is further operable to receive a second communication associated with the networked device over the communication link of the radio access network; the processor is further operable to determine whether the second communication is a second emergency communication;
the memory is further operable to store second location information of the networked device associated with the second emergency communication;
the processor is further operable to determine whether a second time associated with the second emergency communication is within the time criteria; and the network interface is further operable to communicate the second location information of the networked device to the requesting user when the identification of the requested networked device matches the identification of the networked device and the second time associated with the second emergency communication is within the time criteria.

4. The apparatus of claim 1, wherein the location information of the device comprises an identification of a base station.

5. The apparatus of claim 1, wherein the identification of a networked device is an international mobile subscriber identifier (IMSI) associated with the networked device.

6. A method, comprising:
receiving a communication associated with a networked device over a communication link of a radio access network;
determining, by a processor, whether the communication is an emergency communication;
storing location information of the networked device associated with the emergency communication;
receiving, from a requesting user, a location request, wherein the location request identifies a requested networked device;
determining, by the processor, whether the identification of the requested networked device matches an identification of the networked device; and
communicating the location information of the networked device to the requesting user when the identification of the requested networked device matches the identification of the networked device;
wherein the method further comprising blocking, by the processor, the location request when the requested networked device does not match the networked device; and wherein the location request further comprises a time criteria; and further comprising:
storing a time associated with the emergency communication; determining, by the processor, whether the time associated with the emergency communication is within the time criteria; and
communicating location information of the networked device when the identifier of the requested networked device matches the identifier of the networked device and the time associated with the emergency communication is within the time criteria.

7. The method of claim 6, further comprising determining, by the processor, whether the emergency communication occurred within a predetermined time period of receiving the location request.

8. The method of claim 6, further comprises:
receiving a second communication associated with the networked device over the communication link of the radio access network;
determining, by the processor, whether the second communication is a second emergency communication;
storing a second location information of the networked device associated with the second emergency communication;
determining, by the processor, whether a second time associated with the second emergency communication is within the time criteria; and
communicating the second location information of the networked device to the requesting user when the identification of the requested networked device matches the identification of the networked device and the second time associated with the second emergency communication is within the time criteria.

9. The method of claim 6, wherein the location information of the device comprises an identification of a base station.

10. The method of claim 6, wherein the identification of a networked device is an international mobile subscriber identifier (IMSI) associated with the networked device.

11. A non-transitory computer readable medium comprising logic, the logic is configured to:
receive a communication associated with a networked device over a communication link of a radio access network;
determine whether the communication is an emergency communication;
store location information of the networked device associated with the emergency communication;
receive, from a requesting user, a location request, wherein the location request identifies a requested networked device;
determine whether the identification of the requested networked device matches an identification of the networked device; and
communicate the location information of the networked device to the requesting user when the identification of the requested networked device matches the identification of the networked device;
wherein the logic is further configured to block the location request when the identification of the requested networked device does not match the identification of the networked device;
wherein the location request further comprises a time criteria; and
the logic is further configured to:
store a time associated with the emergency communication;
determine whether the time associated with the emergency communication is within the time criteria; and
communicate location information of the networked device when the identifier of the requested networked device matches the identifier of the networked device and the time associated with the emergency communication is within the time criteria.

12. The computer readable medium of claim 11, wherein determining whether the identification of the requested networked device matches an identification of the networked device further comprises determining whether the emergency communication occurred within a predetermined time period of receiving the location request.

13. The computer readable medium of claim 11, wherein the logic is further operable to:
   receive a second communication associated with the networked device over the communication link of the radio access network;
   determine whether the second communication is a second emergency communication;
   store a second location information of the networked device associated with the second emergency communication;
   determine whether a second time associated with the second emergency communication is within the time criteria; and
   communicate the second location information of the networked device to the requesting user when the identification of the requested networked device matches the identification of the networked device and the second time associated with the second emergency communication is within the time criteria.

14. The computer readable medium of claim 11, wherein the identification of a networked device is an international mobile subscriber identifier (IMSI) associated with the networked device.

* * * * *